E. O. & E. CARRINGTON.
MACHINE FOR CUTTING DOWN AUGERS.

No. 66,297. Patented July 2, 1867.

Witnesses;
John H. Sumway
A. J. Tibbits

Inventors
E. O. & E. Carrington
By their Attorney,
John E. Earle

United States Patent Office.

E. O. CARRINGTON AND EDWIN CARRINGTON, OF WALLINGFORD, CONNECTICUT.

*Letters Patent No. 66,297, dated July 2, 1867.*

IMPROVED MACHINE FOR CUTTING DOWN AUGERS.

*The Schedule referred to in these Letters Patent and making part of the same.*

TO ALL WHOM IT MAY CONCERN:

Be it known that we, E. O. CARRINGTON and E. CARRINGTON, of Wallingford, in the county of New Haven and State of Connecticut, have invented a new Machine for Cutting Down Augers; and we do hereby declare the following, when taken in connection with the accompanying drawings, and the letters of reference marked thereon, to be a full, clear, and exact description of the same, and which said drawings constitute part of this specification, and represent, in—

Figure 1:
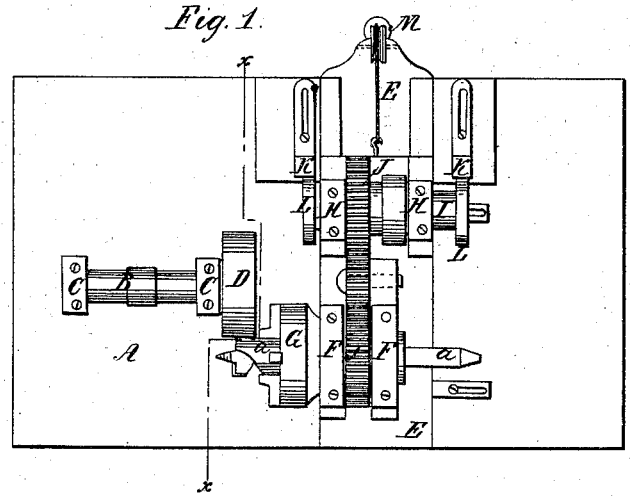

Figure 1, a top view.

Figure 2:
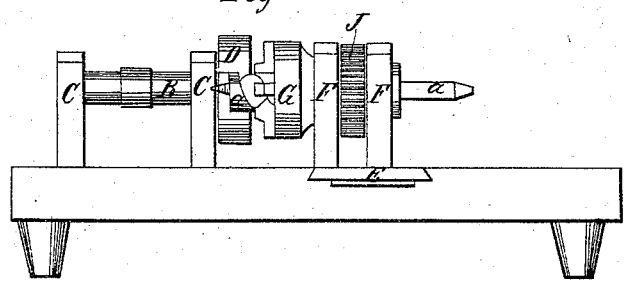

Figure 2, a front view.

Figure 3:
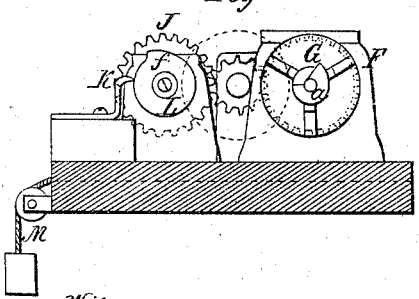

Figure 3, a sectional view on line $x\,x$, and in

Figure 4:
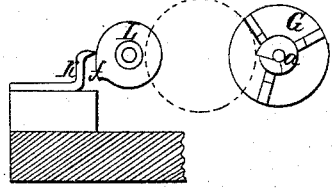

Figure 4 the same section in different position to illustrate the operation.

This invention is designed to form the lip of auger-bits by mechanical means, which has heretofore been done by hand, and has for its object the more perfect formation, as well as to reduce the cost of manufacture.

In the manufacture of auger-bits it is essential that the lip or cutter project slightly beyond the body of the auger in order that the body may turn with very little friction, therefore the auger at the cutting point is not perfectly round, and it cannot be formed or finished in the common lathe. It has therefore heretofore been done by hand, filing or grinding and finishing that part of the auger, which is no small item in the cost of manufacture, to say nothing of the unavoidable imperfection arising from this manner of finishing. By our invention this labor is automatically performed, and in the most perfect manner, and all the bits of an intended certain size will be exactly alike, and the curve given to the lip be done with mathematical precision.

In order to the clear understanding of our invention, as well as to enable others to construct the same, we will proceed to a description of the same as illustrated in the accompanying drawings.

A is the bed-plate, of any convenient form, supporting on a shaft B, in bearings C, a cutting or grinding-mill, D, which may be either a mineral or metallic surface, and is caused to revolve by the application of power to the shaft B in any convenient manner. In proper guides upon the bed-plate is arranged a carriage, E, so as to move freely transversely on the said bed-plate, that is to say, at right angles to the shaft B. Upon the said carriage in proper bearings F is arranged a scroll or other chuck, G, through the centre of which the bit $a$ is passed, and clamped centrally in the said chuck in the usual manner of griping articles in similar chucks. Upon the bearings H upon the said carriage is arranged a shaft, I, having upon its two ends a cam, L, and the shaft I and the chuck G caused to revolve at an equal velocity by means of gearing J J, and the said cams bear against adjustable guides K, which said guides are fixed to the bed-plate independent from the carriage E, so that by the revolution of the shaft I the said carriage is moved to or from the said guides, according to the irregularities in the surface of the said cams, and the said carriage is held back, so that the cams constantly bear against the said guides, by means of a weight, M, or other convenient similar arrangement.

This completes the construction of our machine. Its operation is as follows:

The cams L are first formed, having a projection, $f$, in the surface corresponding to the required projection of the lip of the auger, and the guides K are adjusted so that the centre of the chuck G is brought into the proper relative position to the cutter or mill D, as seen in fig. 3, the cutter being denoted by the red line. The auger or bit is then placed through the chuck to the proper position, as seen in figs. 1 and 2, that is to say, so that the lip of the auger and the projection of the cam correspond to each other, so that, revolving together, the lip of the auger will be found to correspond to the projection of the cam, and there griped by the jaws of the chuck, and, the cutter caused to revolve, cuts from the surface of the bit, which is caused to slowly revolve in any convenient manner. The cam L, bearing against the guides K, holds the auger against the cutter, and both turning together, and the projection on the cam corresponding to the lip on the auger, gradually moves the auger from the cutter as it approaches the lip, and thus forms the bit in the most perfect manner, and every bit of the same size will be of like perfect form. The same cams answer for several different-sized bits, it only being necessary to adjust the guides so that the bits stand in the proper relative position.

We have thus far described our machine as for bits or augers of a single cutter. If for double cutters, then the cams should be formed with like projections upon opposite sides, or the cams should be caused to revolve twice to one revolution of the bit. Such adjustment would be readily understood by those skilled in the use of machinery without further illustration; and the amount of saving by this invention over the old hand process of finishing is too apparent to need further mention.

Having therefore thus fully described our invention, what we claim as new and useful, and desire to secure by Letters Patent, is—

The combination of the bit-holding device G, and the forming cams L with the mill or cutter D, all constructed, arranged, and operating in the manner and by the means substantially as herein set forth.

E. O. CARRINGTON,
EDWIN CARRINGTON.

Witnesses:
RICHARD TIBBALS,
A. J. TIBBITS.